Oct. 3, 1961  W. C. WILKINSON  3,003,083
ELECTRICAL DISTRIBUTION SYSTEM
Filed July 1, 1957  2 Sheets-Sheet 1
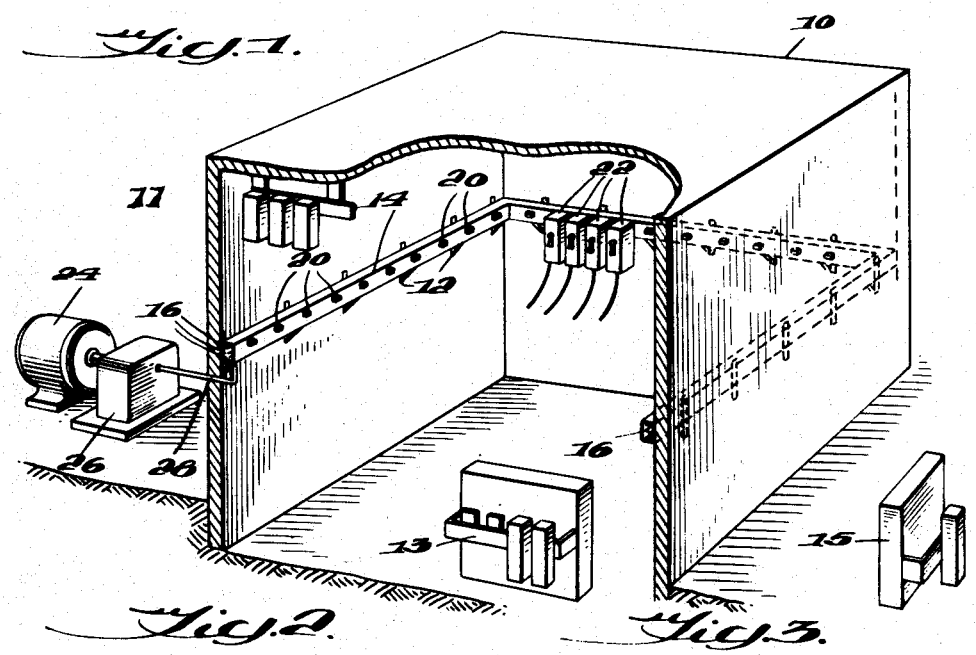
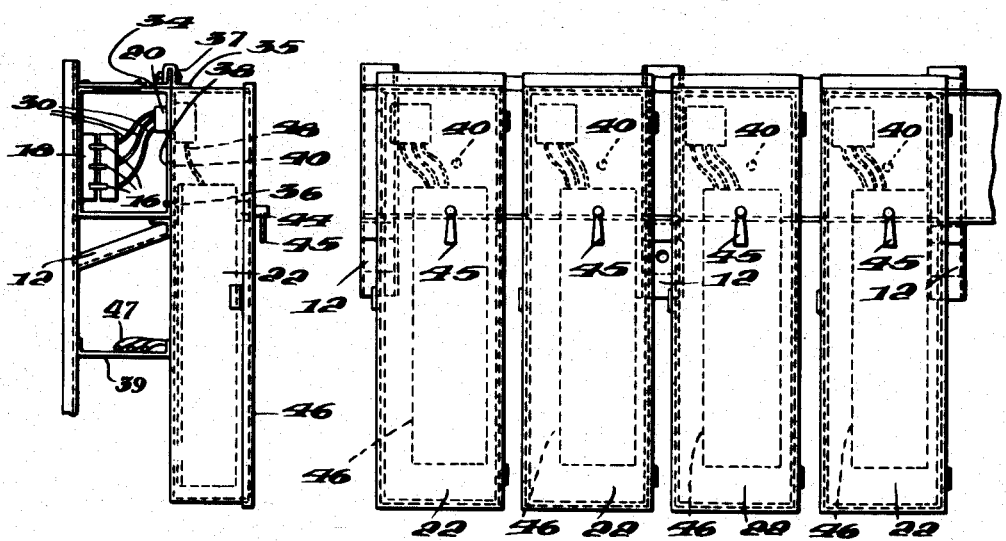
INVENTOR
WELDON C. WILKINSON,
BY
Fisher & Christen
ATTORNEYS Oct. 3, 1961
W. C. WILKINSON
3,003,083
ELECTRICAL DISTRIBUTION SYSTEM
Filed July 1, 1957
2 Sheets-Sheet 2
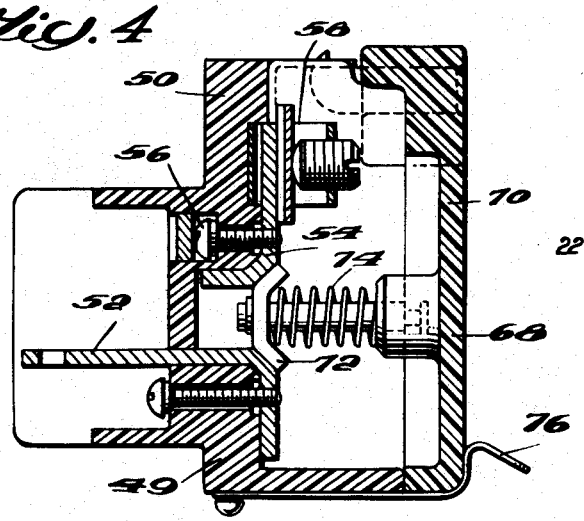
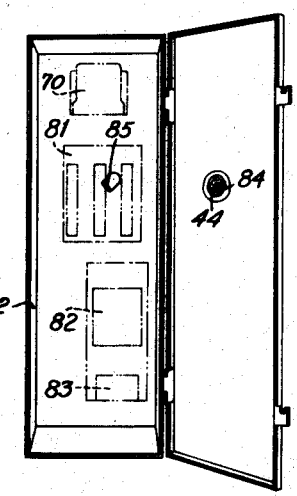
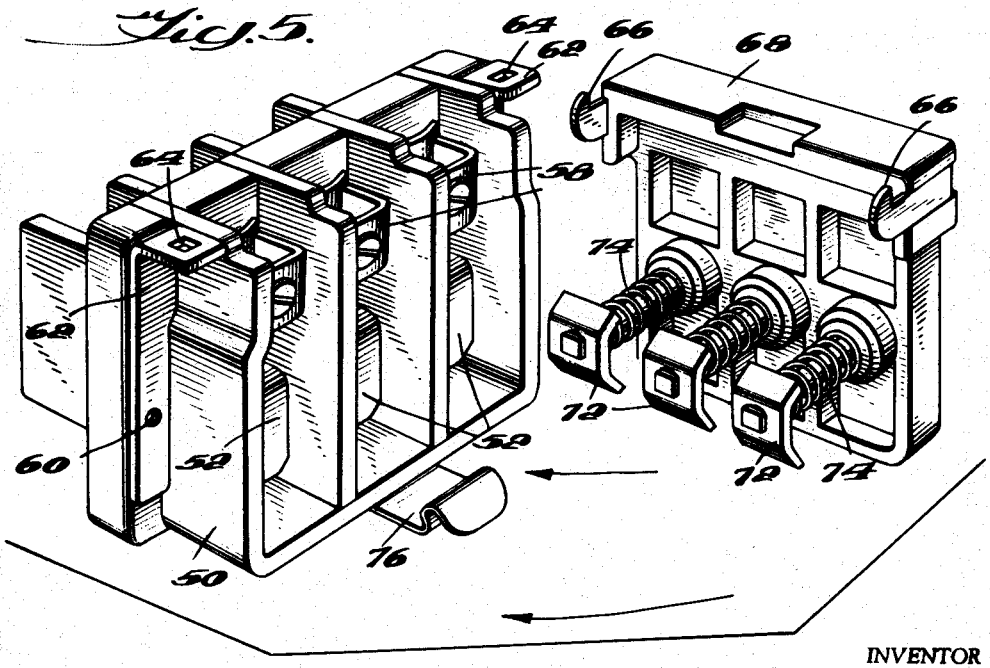
INVENTOR
WELDON C. WILKINSON,
BY Fisher & Christen
ATTORNEYS 3,003,083
ELECTRICAL DISTRIBUTION SYSTEM
Weldon C. Wilkinson, Baltimore, Md., assignor to Rowan Controller Company, Inc., Baltimore, Md., a corporation of Maryland
Filed July 1, 1957, Ser. No. 668,973
3 Claims. (Cl. 317—99)

This invention relates to an electrical distribution system, and more particularly, the invention relates to an electrical distribution system for factories and the like requiring a number of outlets for supplying current to a large number of motor installations and the like.

In accordance with the present practice, plants having need for operating a number of heavy motors substantially independently, will locate such motors at their proper positions and run heavy cable to a central power supply. Associated with the central power supply are known control devices for selectively operating the motors as desired. Such installations have the principal disadvantage that for each motor or the like the heavy cable which carries the current to the motor must be installed from the control center to the motor in accordance with the existing electrical codes. Not only does the original installation require a complex system of cables all over the plant, but to rearrange machinery for changing the original installation to a different type of operation, requires the destruction of the existing system and re-installation of a completely new system.

It is the object of the present invention to eliminate the disadvantages of the present practice with its central control and supply system. The principal disadvantages are eliminated and the object attained by providing a main bus mounted all around the walls of the plant and enclosed in a bus duct. Spaced along the bus duct (approximately 14 inches on center, for example) are outlets preferably consisting of line terminal blocks. These terminal blocks are permanently mounted on the bus duct and, when not in use, are encased or covered so as to leave no exposed live contacts. Each of the terminal blocks, however, is permanently electrically connected to the bus or cable so that by pulling off the cover of the terminal block or outlet, the hot contacts are exposed.

It is to be understood that when the term "bus" is used, reference is made to non-insulated conductors or insulated cable.

The principal advantage of the arrangement according to the invention is that outlets for all electrical installations are readily available after the original installation of the bus duct and outlet system. Thus, either the installation of new equipment or the subsequent rearrangement of existing equipment also can be easily accomplished.

Further, the system in accordance with the present invention permits a pressurizing of the current carrying and switching components in hazardous areas. In accordance with present practice, such hazardous areas are maintained completely under pressure so that the whole room is being continuously exhausted in order to avoid the ignition of combustible gases by arcs drawn by the switching components. In accordance with the present invention, the bus duct and switching assembly is connected to a supply of gas under pressure so that the pressure in the system is greater than atmospheric. Thus, it is impossible for any combustible gases to get into the switching mechanism where an arc is liable to cause an explosion.

Another object of the invention is to mount the switching mechanism, which would consist of a disconnecting switch or circuit breaker, a magnetically operated contactor, and possibly an overcurrent relay, or any combination of such units, on the bus duct with an interlock arrangement by which the switching mechanism could not be dismounted without disconnecting the main switch or circuit breaker. This is not only a valuable safety feature from the standpoint of the electrical hazard, but it insures that there will be no arcing such as might ignite combustible gases when the assembly is being dismounted.

Another object of the invention is to provide a bus duct and outlet system as described with a housing for electrical components extending down from the duct, and a cable tray mounted behind the housing and spaced below the duct.

These and other objects of the invention will become more readily apparent from the following detailed description of the invention taken in conjunction with the accompanying drawings, in which:

FIG. 1 is a perspective diagrammatic view showing a plant installation;

FIG. 2 is an elevational view partly in section of the bus duct and starter combination;

FIG. 3 is a front elevational view of the bus duct and starter combination of FIG. 2;

FIG. 4 is a cross sectional view of the terminal block and safety disconnect jack to be used in the assembly;

FIG. 5 is an exploded perspective view of the terminal block and safety disconnect jack, and FIG. 6 is a diagrammatic perspective view of a combination starter and housing therefor.

Referring to FIG. 1, three walls of a room of a plant are indicated at 10. Mounted by means of brackets 12 is an elongated bus duct 14 extending around the periphery of the plant. It is to be understood that the bus duct could cross the plant intermediate the walls or could be mounted to the ceiling as shown at 11 if advisable. Other arrangements such as self contained, insulated stations 13 comprising racks supporting ducts with varying numbers of outlets could be used depending on the particular plant arrangement. Further, it is within the scope of the invention to make installations outside the plant building as shown at 15.

Inside the bus duct are buses or cables 16 which are mounted in suitable supports 18 (FIG. 2) of insulating material in a known manner. Substantially uniformly spaced around the room on the bus duct are outlets 20, to be described in detail below. An assembly of housings 22 for electrical components is shown on one of the bus duct sections, by way of example. Each of the housings 22 is associated with an outlet.

Associated with the duct and housing assembly is a motor 24 and a gas supply or compressor 26 arrangement feeding through tube 28 into the bus duct. The compressor maintains the bus duct at a pressure considerably above atmospheric in order to prevent any gases in the room from entering into the housing 22 containing electrical components where an arc might cause an explosion.

Each outlet 20 is connected by suitable conductors 30 to the buses 16 in a relatively permanent manner. The bus duct and outlet assembly is in this state of electrical connection at the time of the completion of the original installation.

If it is desired to connect motors, for example, to the bus, the housing 22 contains a control unit such as a combination starter for each motor and is mounted to the bus duct principally by means of the angle member 34 and support member 35 which terminates in the inverted U-shaped portion 37. The portion 37 extends along the top of housing 22 and prevents dust from passing between members 34 and 35 into the back of housing 22. An additional point of connection is by means of metal screws or bolts 36 which are accessible from the inside of the housing 32. The screw 36 cooperates with a switch interlock which insures that the housing 22 be removed only when the main switch is in "off" position as described below.

Small holes 38 and 40 in the duct and housing 22, respectively, are aligned to permit gas under pressure from compressor 26 to fill the combination starter. The holes in the bus duct are normally plugged by screws for example when there is no attached combination starter. Mounted behind housing 22 and spaced below duct 14 is a tray 39 for receiving cable 41 leading from the components in the housing to the electrical equipment such as motors to be operated.

As illustrated in broken lines in FIG. 6, each combination starter will comprise known elements including a main disconnecting switch 81 or circuit breaker, a magnetically operated contactor 82 and possibly an overload relay 83 or combination of one or more of such components. Engaging the disconnecting switch or circuit breaker is an interlock indicated diagrammatically at 44 associated with a handle 45 which is operable upon opening of an access door 46 to the housing 32. Upon opening of access door 46, the interlock system indicated at 44 will open the disconnecting switch or circuit breaker thereby rendering the combination starter inoperative.

The interlock is slotted as at 84 to receive an apertured flange 85 which, when rotated, will operate disconnect switch 81. A finger, not shown, in the interlock 84 will project into the aperture of flange 85 when handle 45 is rotated to closed position. Thus the interlock 84, when rotated by handle 45, performs the dual function of closing disconnect switch 81 and latching door 46. The interlock is known and, per se, forms no part of the present invention.

The combination starter components are electrically connected to the outlet by conductors 48.

The outlet consists of a terminal block 49 having a support of insulating material 50 onto which is mounted a feeder or bus contact 52 which is normally permanently connected to the bus by conductors 30 (FIG. 2). Starter or load contacts 54 are mounted by bolts 56 to the support 50 spaced from the feeder contacts 52. A suitable connector 58 is associated with each starter contact 54 for the purpose of connecting conductors 48 (FIG. 2) to the terminal block. The terminal block is provided with holes 60 at either side of the block to permit its being mounted to the bus duct. Also, at either side of the terminal block are hinge supports 62 having holes 64 to receive hinges 66 on a safety disconnect jack 68.

The disconnect jack consists of a support or cover 70 of insulating material having perpendicularly mounted posts on which are slidably mounted bridging contacts 72. The bridging contacts are biased toward the terminal block by compression springs 74.

When assembled, the hinges 66 hook into the holes 64 in hinge supports 62 and a spring steel snap 76 holds the cover closed on the terminal block with the bridging contacts 72 in firm engagement with the contacts 52 and 54.

When the disconnect jack of the type shown in FIGS. 4 and 5 is mounted in engagement with the terminal block to bridge the contacts 52 and 54, the connectors 58 are "hot" or connected through bridges 72 to the bus bars in the ducts. This is an undesirable condition unless there is equipment attached for operation. Consequently, for terminal blocks which are not in use, the cover 70 will be provided with insulated blanks in place of the bridging contacts 72. Thus, the connectors 58 will normally remain insulated from the hot contacts 52.

In summary of the application of the invention, a building preferably would be provided at its original installation with a complete bus duct 14 containing buses 16. Spaced around the bus duct will be outlets 20, each consisting of the terminal block and disconnect jack. Normally, the safety disconnect jack will be provided with blanks of insulating material instead of the bridging contacts 72.

Optional equipment for use in areas where hazardous combustible gas is present is the motor and compressor unit which maintains the bus duct constantly under pressure greater than atmospheric.

Any time the installation of motors or the like is desired, the combination starters 22, for example, are mounted on the bus duct, each one enclosing a safety jack. The combination starter is mounted in such a way that it can only be dismounted when the access door 46 is open, thereby operating the interlock which disconnects the main switch in the combination starter. Thus, while the combination starter is normally under pressure greater than atmospheric provided through holes 38 and 40 in the duct and combination starter housing, when the door is opened to dismount the starter and the high pressure no longer obtains, no undesirable arcing can occur in view of the fact that the interlock has disconnected the equipment from the line. Additionally, the hazard arising from hazardous atmosphere being ignited by an arcing electrical contact is virtually eliminated.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

I claim:

1. An electrical distribution system comprising, an elongated bus duct, at least one bus located in said duct, said duct having a plurality of apertures spaced along said duct, a terminal block of insulating material secured to said duct in each said aperture, at least one bus contact embedded in said block, said contact being connected to said bus and extending through said block, a load contact secured to said block on the side of said block remote from said duct, said load contact being located adjacent but spaced from said bus contact, an insulative cover for said block, an electrically conductive bridge mounted on said cover, means for securing said cover to said block to place said bridge in engagement with said contacts, a control unit housing, means accessible from within said housing for removably securing said housing to said duct in a position surrounding said block and cover, a control unit in said housing, at least one electrical connection from said control unit to said load contact, said control unit including a disconnecting switch, a door for said housing, and interlock means between said housing door and said switch to effect opening of said switch when said door is opened.

2. An electrical distribution system comprising, an elongated bus duct, at least one bus located in said duct, said duct having a plurality of apertures spaced along said duct, a terminal block of insulating material secured to said duct in each said aperture, at least one bus contact embedded in said blocks, said contact being connected to said bus and extending through said block, a load contact secured to said block on the side of said block remote from said duct, said load contact being located adjacent but spaced from said bus contact, an insulative cover for said block, an electrically conductive bridge mounted on said cover, means for securing said cover to said block to place said bridge in engagement with said contacts, a control unit housing secured to said duct in a position surrounding said block and cover, a control unit in said housing, at least one electrical connection from said control unit to said load contact, said duct and housing having a passageway therebetween, a source of gas under pressure greater than atmospheric connected to said duct, whereby said duct and housing will normally be under pressure greater than atmospheric.

3. An electrical distribution system comprising, an elongated bus duct, at least one bus located in said duct, said duct having a plurality of apertures spaced along said duct, a terminal block of insulating material secured to said duct in each said aperture, at least one bus contact embedded in said block, said contact being connected to said bus and extending through said block, a load contact secured to said block on the side of said block remote from said duct, said load contact being located adjacent but spaced from said bus contact, an insulative cover for said block, an electrically conductive bridge mounted on said cover, means for securing said cover to said block to place said bridge in engagement with said contacts, a control unit housing secured to said duct in a position surrounding said block and cover, a control unit in said housing, and at least one electrical connection from said control unit to said load contact.

References Cited in the file of this patent

UNITED STATES PATENTS

| | | |
|---|---|---|
| 1,857,711 | Dante | May 10, 1932 |
| 1,920,683 | Edsall | Aug. 1, 1933 |
| 2,209,560 | Carlson | July 30, 1940 |
| 2,223,300 | DeBellis | Nov. 26, 1940 |
| 2,363,364 | Rugg | Nov. 21, 1944 |
| 2,394,060 | Holmes | Feb. 5, 1946 |
| 2,786,908 | Constantine | Mar. 26, 1957 |
| 2,787,744 | Brock | Apr. 2, 1957 |
| 2,824,939 | Claybourn | Feb. 25, 1958 |

FOREIGN PATENTS

| | | |
|---|---|---|
| 584,414 | Great Britain | Nov. 13, 1944 |
| 553,607 | Great Britain | May 28, 1943 |

OTHER REFERENCES

Westinghouse Engineer, vol. 13, July 1953, pp. 118–120.

Bulldog Bull, 427-3, June 1946, pp. 37–40.